United States Patent [19]

Nelson

[11] 4,008,797
[45] Feb. 22, 1977

[54] MINING MACHINE CONVEYOR WITH DEFLECTIBLE BOOM

[75] Inventor: Robert C. Nelson, Bluefield, W. Va.

[73] Assignee: West Virginia Armature Co., Inc., Bluefield, W. Va.

[22] Filed: Aug. 14, 1975

[21] Appl. No.: 604,558

[52] U.S. Cl. .............................. 198/318; 198/864; 299/64

[51] Int. Cl.² ........................................ B65G 21/12

[58] Field of Search ............ 198/109, 87, 113, 114, 198/115, 121; 212/58, 59, 46 R; 299/64; 37/192; 267/158

[56] References Cited

UNITED STATES PATENTS

| | | | |
|---|---|---|---|
| 2,388,385 | 11/1945 | Cartlidge | 198/109 X |
| 2,439,219 | 4/1948 | O'Connor | 267/158 X |
| 2,606,063 | 8/1952 | Clarkson et al. | 198/109 |
| 2,792,791 | 5/1957 | Kreissig | 198/109 X |
| 3,616,893 | 11/1971 | Knadle | 198/115 |
| 3,750,858 | 8/1973 | White | 198/115 |
| 3,762,532 | 10/1973 | Nelson | 198/109 X |

Primary Examiner—Evon C. Blunk
Assistant Examiner—Richard K. Thomson
Attorney, Agent, or Firm—McCaleb, Lucas & Brugman

[57] ABSTRACT

A mobile mining machine having an elevatable conveyor boom with a vertically deflectible end section. The end section of the boom is connected to the main section of the boom by a pivoted connection to provide relative vertical tilting movement. Stacks of leaf springs fastened flatwise to upper and lower surfaces of the boom side rails at the pivoted connection normally hold the end section in a working position aligned with the main section but enable vertical deflection of the end section when an abnormal and possibly destructive force is applied to the end of the boom.

6 Claims, 7 Drawing Figures

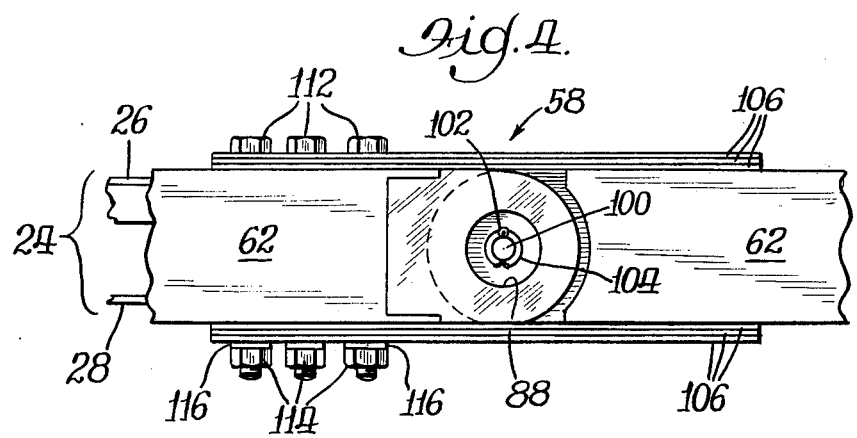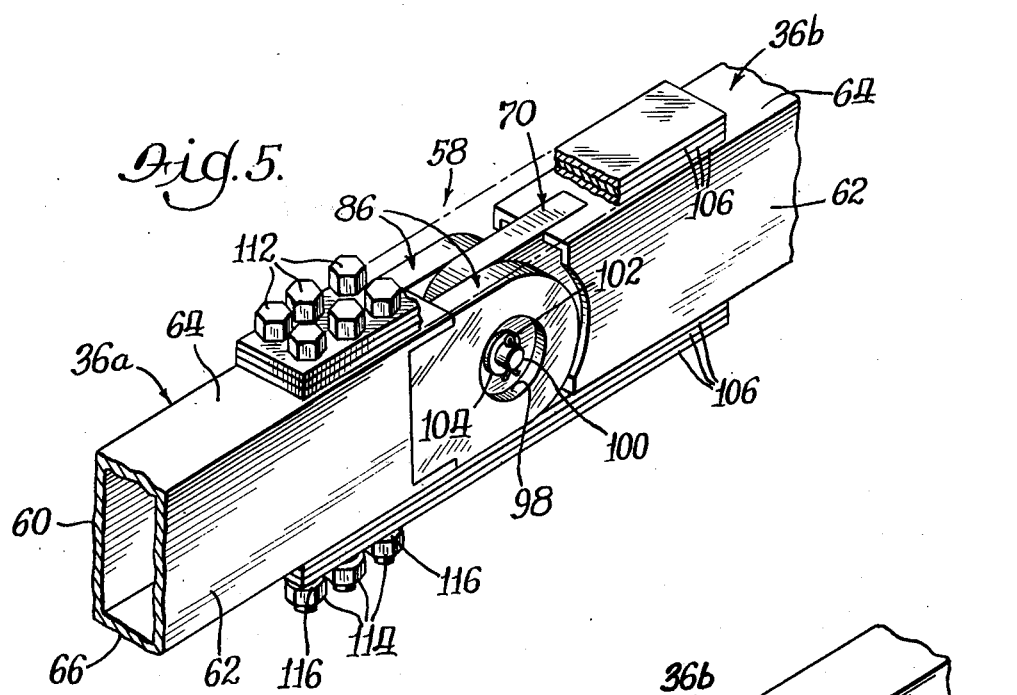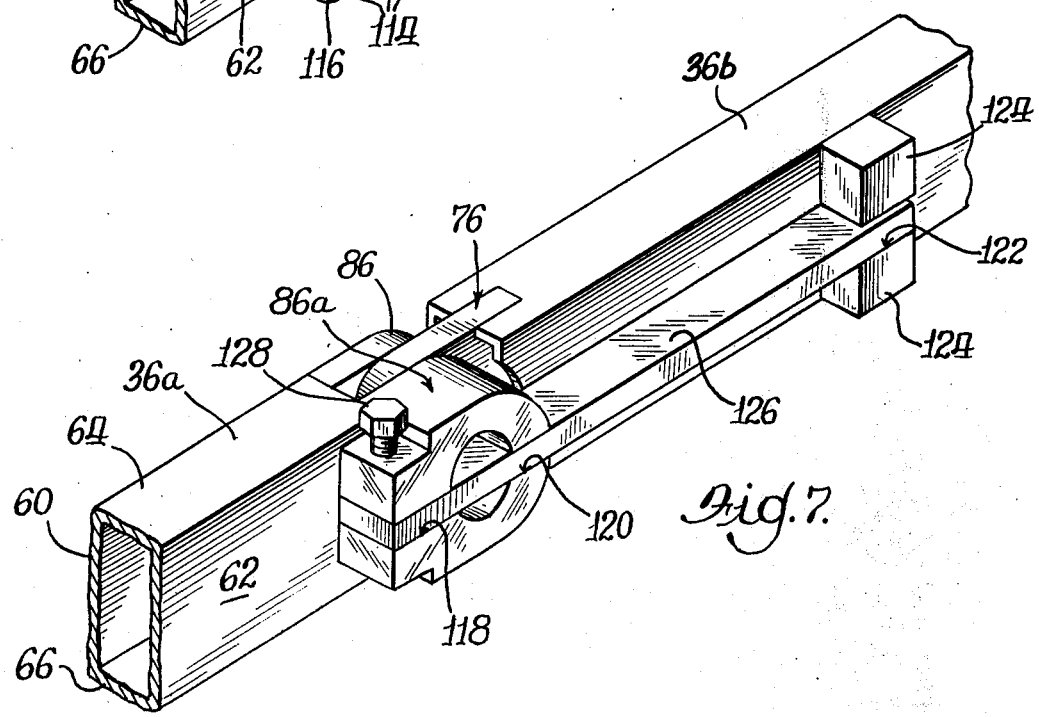

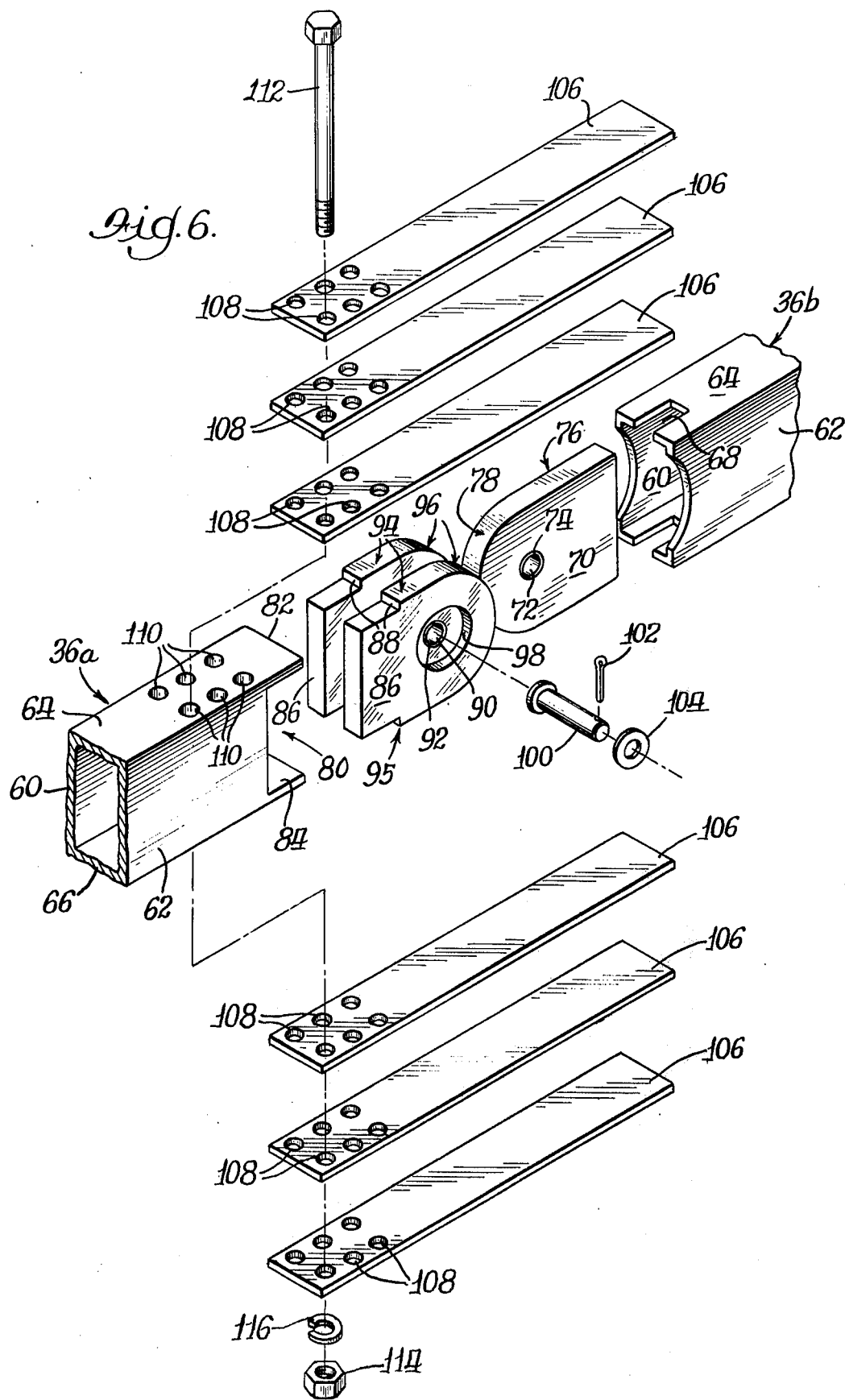

MINING MACHINE CONVEYOR WITH DEFLECTIBLE BOOM

BACKGROUND OF THE INVENTION

Mobile mining machines such as mobile transfer conveyors, loaders, and continuous miners have an endless conveyor element such as a belt or chain trained for orbital movement in conveying and return runs between inbye and outbye reversing members such as pulleys or sprockets.

The outbye pulley or sprocket is almost always mounted on a vertically movable boom, to adjust its discharge height. The inbye pulley or sprocket may also be mounted on a vertically movable boom, this being the case for mobile transfer conveyors in which both receiving and discharge booms extend from the main frame.

These machines have a short wheel or crawler base and a relatively long conveyor, often with substantial fore and aft overhang. A small dipping movement of the base when being trammed or towed along an uneven mine bottom causes a much larger vertical movement of the ends of the machine, including one or both ends of the conveyor booms. This can cause the end of the conveyor boom to strike the top or bottom with considerable force and damage the conveyor or wedge or hang up the machine so the conveyor has to be raised or lowered to free it.

Further, these conveyor booms are raised and lowered by powerful hydraulic jacks operating under several hundred or even several thousand pounds per square inch. For maximum production and conveying capacity, these machines generally use up most of the available head room and a common problem is hang up of one end or the other with the top or bottom when the operator makes a tilting or leveling adjustment. Again the machine has to be raised or lowered at one end to free it.

BRIEF SUMMARY OF THE INVENTION

A general object of the invention is to provide a deflectible conveyor boom for a mining machine to prevent hang up of the machine, and resulting damage, when an inbye or outbye conveyor boom engages the mine top or bottom, either during tramming or as the result of excessive vertical adjustment of the boom.

Important features of the invention are to provide a vertically pivoted connection between an elevatable main section of a conveyor boom and the end section of the boom, and to provide spring means normally holding the end section in a working position aligned with the main section but enabling vertical deflection about that pivoted connection when an abnormal vertical force is applied sufficient to overcome the bias of the sping means.

Other objects and advantages will be apparent from the following description taken in connection with the accompanying drawings in which:

BRIEF DESCRIPTION OF THE DRAWINGS

FIG. 4 is a fragmentary enlarged view of FIG. 1 showing one of the spring-held pivot joints;

FIG. 5 is a perspective view of FIG. 4;

FIG. 6 is an exploded perspective view showing the components of FIGS. 4 and 5; and FIG. 7 is a perspective view, similar to FIG. 5, of an alternate form of the invention.

Like parts are designated by like reference characters throughout the figures.

DESCRIPTION OF THE PREFERRED EMBODIMENTS

Figure 1:
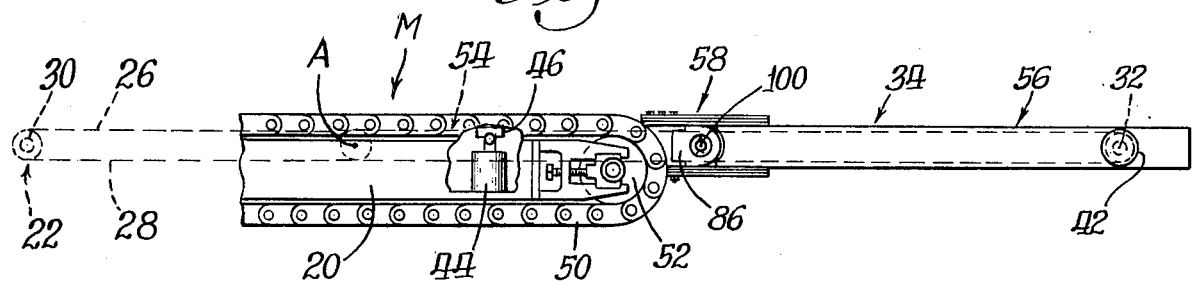
FIG. 1 is a fragmentary side view of the outbye end portion of a mining machine with an outbye conveyor boom illustrating one form of the present invention and with certain other parts being shown schematically.
Figure 2:
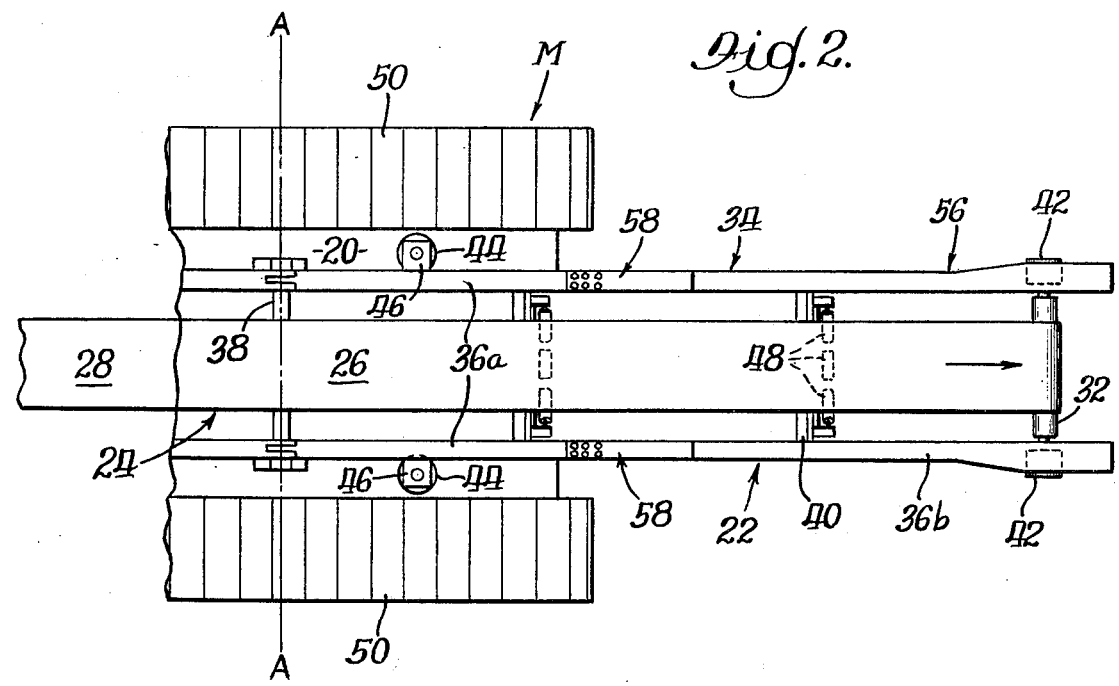
FIG. 2 is a top, plan view of FIG. 1.

Only the outbye or discharge portion of a mobile mining machine M is shown illustrating the invention as it would be applied to the outbye conveyor boom of a mobile transfer conveyor, continuous miner, loader or any other machine having a boom which might encounter the top or bottom.

The machine has a main frame 20 with an elongated conveyor generally designated 22 including an an endless conveyor element 24 trained for orbital movement in conveying and return runs 26 and 28, respectively, between inbye and outbye pulleys 30 and 32, respectively.

The conveyor outbye boom is generally designated 34 and consists of a pair of horizontally spaced side rails 36, 36 having a main pivoted connection about shaft 38 along transverse axis A—A on frame 20. The side rails 36 are held in rigid spaced relationship by transverse members including cross struts 40. The outbye pulley 32 is rotatably journaled at the end of the outbye (discharge) boom, between the side rails 36, and may also be connected to hydraulic drive motors 42 to move the belt.

A pair of elevating jacks 44, 44, mounted upright in the frame 20 on each side of the conveyor, are connected at their upper ends through suitable flexible or sliding connections to lugs 46 welded to the outsides of the rails. By directing hydraulic fluid under pressure to one end or the other of the jacks, the outbye boom 34 may be tilted up or down about the axis A—A to vary the discharge height. Any suitable means may be provided for supporting the upper and lower runs of the conveyor belt between the end pulleys, for example the conveying run 26 may be supported on troughing rollers 48 and the return run 28 may be supported by sliding engagement on the cross struts 40, or by return rollers or a sliding plate (not shown).

A pair of track type endless crawlers 50 trained between sprockets 52 (only one of which is shown per crawler) are provided on opposite sides of the main frame 20. Drive and control means (not shown) enable the machine end to be self-tramming in inbye or outbye directions.

The boom 34 has a main section 54 wherein the sections of the side rails 36 are designated 36a; and an end section 56 wherein the sections of the side rails 36 are designated 36b.

There is a supplemental pivoted connection between the main and end boom sections 54 and 56. This comprises a pair of pivot joints 58, 58, one between each of the adjoining side rail sections 36a and 36b. The axis of this pivoted connection is substantially centered between the conveying and return runs of the conveyor. Each of these pivot joints, with the associated spring means involved in the present invention is shown in detail in FIGS. 4, 5 and 6.

Referring now to those detailed views, each of the side rail sections 36a and 36b comprises a rectangular cross-section, hollow, box-channel member having side walls 60 and 62, and top and bottom walls 64 and 66.

The sections 36a and 36b of each side rail 36 are pivotally interconnected by means which will now be described. Refer to FIGS. 4, 5 and 6. Each side rail section 36b is formed with upper and lower central, longitudinal, open-ended slots 68. A vertical plate 70 is assembled in the slots and held in place as by welding. Each plate 70 has a pivot opening 72 with a tubular bushing 74, and horizontal top and bottom surfaces 76 coplanar with the outside surfaces of the respective top and bottom walls 64 and 66. The ends of the rail sections 36b have arcuate surfaces 78 concentric with the pivot opening 72.

Each rail section 36a has a rectangular opening 80 in each side wall 60 and 62, leaving longitudinal extensions 82 and 84 of the top and bottom walls 64 and 66. A pair of vertical side plates 86, 86 are assembled within the openings and spaced just far enough apart to flank and closely lap opposite sides of plate 74, and is held in place as by welding.

Each plate 86 has an inner end portion of sufficient vertical dimension to fit snugly between the upper and lower wall extensions 82, 84, with their outer surfaces substantially flush with the outer surfaces of the side walls 60, 62. Each plate member 86 has a pair of shoulders 88 engageable with the ends of extensions 82 and 84. Each has a pivot aperture 90 with a tubular bushing 92 which may be identical with bushing 74. There is a top horizontal surface 94 on each plate 86, coplanar with the outside surfaces of top and bottom walls 64 and 66. Each top surface 94 and the corresponding underside surface 95 are joined by an arcuate extended surface 96 which is concentric with the pivot aperture 90 (and pivot opening 72 when assembled). Each plate 86 has an external counterbore 98 to receive the ends of a headed pivot pin 100 which extends through the bushings 92, 74, 92, when the pivot apertures are in registration as shown in the assembled views of FIGS. 4 and 5. A cotter pin 102, externally of washer 104, holds each pin in place.

Referring still to FIGS. 4, 5 and 6, spring means includes a stack (three shown here) of individual leaf springs 106 engaged flatwise with each other and with the top and bottom rail surfaces 64 and 66 flanking the pivot joint. One end of each leaf spring is provided with a plurality (in this case six) of mounting holes 108. Matching holes 110 are in the top and bottom walls 64 and 66, of each main side rail section 36a. Six sets of bolts 112, nuts 114, and lock washers 116 assemble the stacks of leaf springs flatwise against one another and against the top and bottom walls 64 and 66 as shown. In the normal working position, shown in side view in FIGS. 1, 4 and 5, the end boom section 56 is held as a straight line extension of the main boom section 54.

In use, when the outbye conveyor section is at a normal working height, the stacks of leaf springs 106 will support both the weight of the outbye end section and the mined material conveyed along it. For greater flexibility, or lighter conveyed materials, less than two leaf springs per stack may be used and conversely, for heavier weight material or more rigidity, more leaf springs may be used per stack.

In one specific example, for a conveyor as illustrated in FIGS. 1–6 for handling mined coal, where the height of the side walls 60 and 62 was approximately 7 inches, and the width of the top and bottom walls 64 and 66 was approximately 5 inches, the individual spring leaves 106 were ¼ inch × 4¼ inches × 28 inches, made of standard 1095 spring steel.

Figure 3:
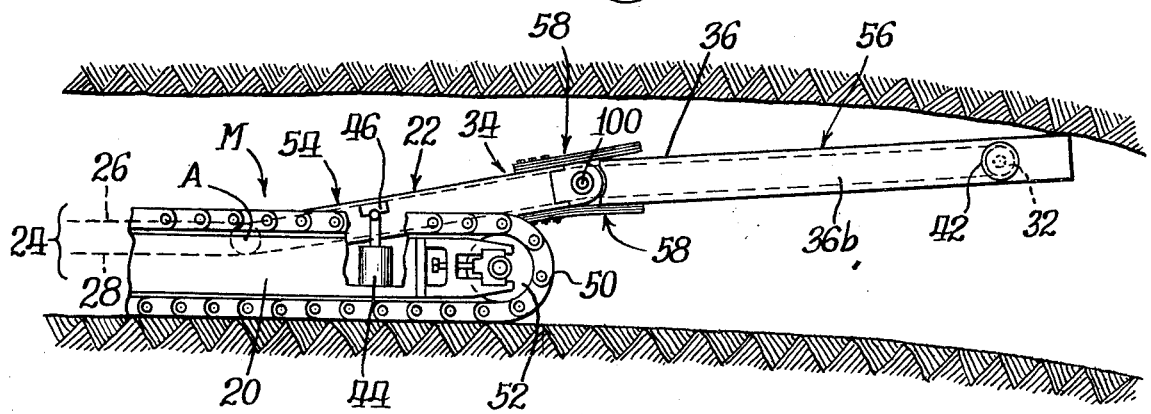
FIG. 3 is a view similar to FIG. 1 showing the outbye boom deflected by engagement with the mine top.

For use and operation, refer to FIG. 3. If, in tramming the machine M toward the left in FIG. 3, the outbye boom is set too high to clear the roof, the abnormal downward force exerted by the roof on the end section of the boom will simply deflect it downward permitted by the yielding of the lower stack of leaf springs as shown in FIG. 3. No damage will be done to the conveyor or any parts of the machine and the operator can either lower the boom or tram it on a little farther to clear the roof. Likewise, if the operator raises the boom excessively and engages the top as shown in FIG. 3, no harm will be done. The same advantages will accrue if the reverse of FIG. 3 occurs, and the end of the boom is forced into the bottom.

Refer now to FIG. 7 which shows an alternate spring means. In this case, the pivoted joint between side rail sections 36a and 36b is identical except as follows: One of the vertical side plates 86 (the one nearest the viewer) in FIGS. 5 and 6 is made substantially thicker and designated 86a. Thus, it protrudes outside beyond the side wall 62 and is provided with horizontally aligned grooves 118 and 120, which are aligned with another groove 122 between lugs 124 fixed as by welding to the outside of side wall section 36b. Extending along and fitted snugly within grooves 118, 120 and 122 is a spring bar 126. The bar is fixed to side rail section 36a by a set screw 128. At the other end, the bar 126 is slidable back and forth between the lugs 124 as the outbye end section of the boom is deflected toward and away from a condition of alignment with the main boom section. In one specific example for use in a mining machine conveyor, each spring bar has been proposed to be 1¼ inches × 3 inches × 24 inches, of 1095 spring steel bar material.

When the stacked leaf spring embodiment of FIGS. 1–6 is deflected between the straight line condition of FIG. 1 and the abnormally loaded, deflected condition of FIG. 3, it will be understood that there will be a certain amount of essential sliding movement between the free end portions of the spring leaves 106, and between the inner one and the surface of the side rail section 36b. It will also be appreciated that the bolted and slidable ends of the leaf springs in the FIG. 1–6 embodiment and the spring bar in the FIG. 7 embodiment may be reversed if desired.

While two forms in which the present invention may be embodied have been specifically shown and described, it will be understood that various modifications and variations thereof may be effected without departing from the spirit and scope of the invention as defined by the appended claims.

The embodiments of the invention in which an exclusive property or privilege is claimed are defined as follows:

1. In a mobile mining machine, a frame, an endless conveyor element trained for orbital movement along a boom extending from one end of said frame, a main pivotal connection between said frame and said boom and means for tiltably adjusting the height of said boom about said main pivoted connection, the improvement comprising:

said boom comprising a main section connected to said frame by said main pivoted connection, and an end section connected to said main section by a supplemental pivoted connection;

spring means carried by said boom at said supplemental pivoted connection biasing said end section toward a normal working position aligned with said main section but enabling vertical tilting movement of said end section to a raised or lowered non-aligned position relative to said main section in response to an abnormal vertical force against said end section sufficient to overcome the bias of said spring means, said spring means being effective to tiltably return said end section upwardly or downwardly to said normal working positions aligned with said main section upon release of said abnormal vertical force.

2. In a mobile mining machine, the combination of claim 1 in which:

said boom comprises a pair of articulated horizontally spaced side rails;

said supplemental pivoted connection comprises a pair of pivot joints one on each side rail, aligned along a horizontal axis transverse to said boom, between said sections; and said spring means comprises separate elongated spring members extending across said pivot joints with the ends engaged respectively with the corresponding side rails on the main and end sections of the boom.

3. In a mobile mining machine, the combination of claim 2 in which:

each of said spring members comprises at least one flexible bar extending across the corresponding pivot joint parallel to the side rails, opposite ends of each bar engaging adjacent portions of the side rails.

4. In a mobile mining machine, the combination of claim 3 in which:

each of said flexible bars is connected to the corresponding side rail by means enabling relative longitudinal sliding movement between the bar and said corresponding side rail during vertical tilting movement of the end section.

5. In a mobile mining machine, the combination of claim 2 in which:

the spring means for each pivot joint comprises a stack of individual leaf springs engaged flatwise against top and bottom side rail surfaces flanking said pivot joint, opposite ends of each stack being respectively fastened to, and slidable relative to, the side rail surfaces so engaged.

6. In a mobile mining machine, the combination of claim 1 in which:

the axis of said supplemental pivoted connection is substantially centered between the conveying and return runs of said conveyor.

* * * * *